J. W. TOWN.
MANURE WAGON.

No. 181,375.

Patented Aug. 22, 1876.

WITNESSES:
Francis McArdle,
John Goethals

INVENTOR:
J. W. Town
BY
ATTORNEYS.

UNITED STATES PATENT OFFICE.

JASON W. TOWN, OF SOUTH WOODBURY, VERMONT.

IMPROVEMENT IN MANURE-WAGONS.

Specification forming part of Letters Patent No. 181,375, dated August 22, 1876; application filed June 6, 1876.

*To all whom it may concern:*

Figure 1:
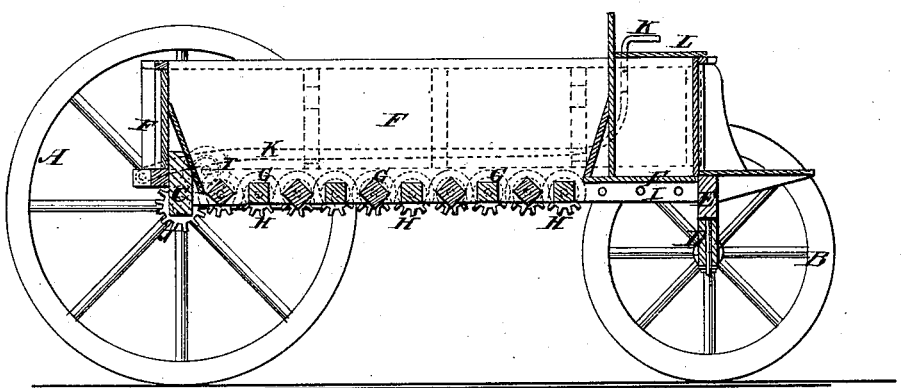
Figure 2:
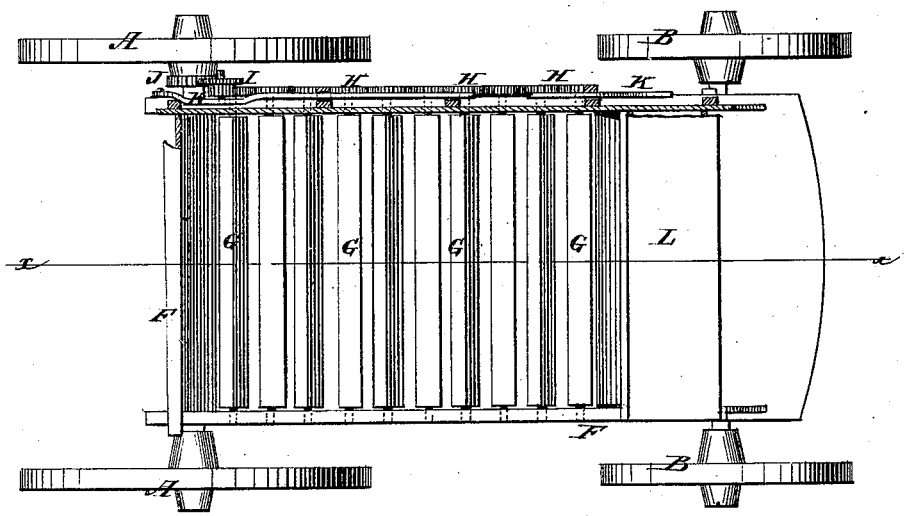

Be it known that I, JASON W. TOWN, of South Woodbury, in the county of Washington and State of Vermont, have invented a new and useful Improvement in Manure-Wagon, of which the following is a specification:

Figure 1 is a vertical longitudinal section of my improved manure-wagon, taken through the line $x\ x$, Fig. 2. Fig. 2 is a top view of the same.

Similar letters of reference indicate corresponding parts.

The invention relates to a wagon having its bottom formed of parallel bars arranged sufficiently close together to prevent escape of the manure while being transported to the field, and yet at such distance apart as will allow the discharge of the manure when the bars are rotated, as hereinafter fully described.

A are the rear wheels. B are the fore wheels. C is the rear axle. D is the fore axle. E is the forward bolster, and F is the wagon-body. The bottom of the wagon-body F is formed of a series of parallel rollers, G, which may be square, round, fluted, or of any other desired form. When the rollers are made square, they may be arranged with their adjacent sides parallel, or with the corners of each roller opposite the sides of the adjacent rollers, as may be preferred. The journals of the rollers G revolve in the sills of the wagon-body A. The journals of the rollers G project at one side of the wagon-body, and to them are attached gear-wheels H, meshing into each other. I are two gear-wheels rigidly connected with each other, and the teeth of one of which mesh into the teeth of the gear-wheel H of the rear roller G. The teeth of the other gear-wheel I mesh into the teeth of a gear-wheel, J, attached to the rear wheel A. The two gear-wheels I are pivoted to a lever, K, the rear end of which is pivoted to the rear part of the wagon-body F. The lever K passes forward along the side of the wagon-body F, and is kept in place by keepers attached to the said wagon-body. The forward end of the lever K is bent upward at the end of the driver's seat L, so that it may be conveniently reached and operated by the driver to throw the gear-wheels I into and out of gear with the gear-wheels H J.

In using the wagon it is loaded and drawn to the place where the manure is to be spread. The lever K is then operated to throw the gear-wheels I into gear with the gear-wheels H J, so that as the wagon is drawn forward the rollers G may be revolved, and may pulverize the manure and work it out through the bottom of the wagon, spreading it evenly over the surface of the ground.

The lever K may be made in three parts, so arranged that the long middle part may slide longitudinally, while the end parts move on pivots. This avoids the necessity of making the lever heavy, to guard against its springing.

Having thus described my invention, I claim as new and desire to secure by Letters Patent—

The manure-distributing wagon, having its bottom formed of angular parallel bars or rollers G, arranged near each other, so as to discharge the manure when rotated, but prevent its escape at other times, as shown and described.

JASON W. TOWN.

Witnesses:
LESTER E. HEATH,
HENRY H. JEWELL.